US008762480B2

(12) United States Patent
Park et al.

(10) Patent No.: US 8,762,480 B2
(45) Date of Patent: Jun. 24, 2014

(54) CLIENT, BROKERAGE SERVER AND METHOD FOR PROVIDING CLOUD STORAGE

(75) Inventors: Seong-yeol Park, Yongin-si (KR);
Min-kyung Hwang, Seoul (KR);
Byung-woan Kim, Seoul (KR);
Kyung-ah Chang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/789,178

(22) Filed: May 27, 2010

(65) Prior Publication Data
US 2010/0325199 A1 Dec. 23, 2010

(30) Foreign Application Priority Data

Jun. 22, 2009 (KR) ........................ 10-2009-0055689

(51) Int. Cl.
*G06F 15/167* (2006.01)
*G06F 15/16* (2006.01)

(52) U.S. Cl.
USPC ........... 709/216; 709/203; 709/214; 709/219; 707/999.204

(58) Field of Classification Search
USPC ............ 709/203, 213–216, 219; 707/999.204
See application file for complete search history.

(56) References Cited

U.S. PATENT DOCUMENTS

| 5,721,916 | A | 2/1998 | Pardikar |
| 5,745,748 | A | 4/1998 | Ahmad et al. |
| 6,269,382 | B1 | 7/2001 | Cabrera et al. |
| 6,389,432 | B1* | 5/2002 | Pothapragada et al. ............... 1/1 |
| 6,735,623 | B1 | 5/2004 | Prust |
| 6,748,502 | B2 | 6/2004 | Watanabe et al. |
| 6,754,696 | B1* | 6/2004 | Kamath et al. ................. 709/213 |
| 6,948,001 | B1* | 9/2005 | Bradley ........................ 709/246 |
| 6,965,924 | B1 | 11/2005 | Gerthe |
| 7,516,208 | B1* | 4/2009 | Kerrison et al. .............. 709/224 |
| 7,539,727 | B2 | 5/2009 | Miller et al. |
| 8,131,825 | B2 | 3/2012 | Nord et al. |
| 8,171,109 | B2* | 5/2012 | Schneider ..................... 709/218 |

(Continued)

FOREIGN PATENT DOCUMENTS

| CN | 1623148 A | 6/2005 |
| CN | 101326491 A | 12/2008 |

(Continued)

OTHER PUBLICATIONS

Wiktionary.org, broker definition, Mar. 15, 2012 http://en.wiktionary.org/wiki/broker.*

(Continued)

*Primary Examiner* — Joseph E Avellino
*Assistant Examiner* — James Conaway
(74) *Attorney, Agent, or Firm* — NSIP Law

(57) ABSTRACT

A system for providing resources of a cloud infrastructure is provided. In the system, a client terminal may dynamically span its storage to heterogeneous cloud storages as necessary. A client determines, when receiving a file access request from an application, whether to process the file access request as a local file access request for access to a local storage of the client or as a cloud file access request for access to a cloud storage connected through the Internet. A brokerage server receives the file access request and supports the client by brokering a connection to a cloud infrastructure in response to the file access request.

17 Claims, 7 Drawing Sheets

(56) References Cited

U.S. PATENT DOCUMENTS

| | | | |
|---|---|---|---|
| 2002/0059299 A1* | 5/2002 | Spaey | 707/104.1 |
| 2002/0065810 A1* | 5/2002 | Bradley | 707/2 |
| 2002/0133561 A1 | 9/2002 | O'Brien et al. | |
| 2003/0084152 A1 | 5/2003 | Chung | |
| 2003/0110263 A1 | 6/2003 | Shillo | |
| 2005/0021915 A1* | 1/2005 | Lowe et al. | 711/154 |
| 2005/0060316 A1 | 3/2005 | Kamath et al. | |
| 2005/0091222 A1 | 4/2005 | Serlet et al. | |
| 2005/0120082 A1 | 6/2005 | Hesselink et al. | |
| 2005/0262146 A1* | 11/2005 | Grace et al. | 707/104.1 |
| 2005/0289218 A1* | 12/2005 | Rothman et al. | 709/203 |
| 2006/0129627 A1* | 6/2006 | Phillips et al. | 709/200 |
| 2006/0200700 A1 | 9/2006 | Malcolm | |
| 2007/0174237 A1* | 7/2007 | Wilbrink et al. | 707/3 |
| 2007/0282853 A1* | 12/2007 | Campbell et al. | 707/10 |
| 2008/0162199 A1* | 7/2008 | Smith et al. | 705/5 |
| 2008/0307178 A1* | 12/2008 | Agombar et al. | 711/162 |
| 2012/0269492 A1* | 10/2012 | Choi et al. | 386/239 |
| 2012/0278450 A1* | 11/2012 | Soltis | 709/219 |
| 2013/0054732 A1* | 2/2013 | Serlet et al. | 709/213 |

FOREIGN PATENT DOCUMENTS

| | | |
|---|---|---|
| CN | 101459697 A | 6/2009 |
| EP | 0 713 183 | 5/1996 |
| JP | 8-255106 A | 10/1996 |
| JP | 2002-324000 A | 11/2002 |
| JP | 2005-25759 A | 1/2005 |
| JP | 2005-501311 A | 1/2005 |
| JP | 2008-217801 A | 9/2008 |
| KR | 10-2004-0071187 A | 8/2004 |
| KR | 10-2005-0034626 A | 4/2005 |
| KR | 10-2006-0087758 A | 8/2006 |
| KR | 10-2006-0108420 A | 10/2006 |
| KR | 10-2002-0054593 A | 6/2008 |
| KR | 10-2009-0050547 A | 5/2009 |
| WO | WO 02/091705 A2 | 11/2002 |
| WO | WO 03/083716 A1 | 10/2003 |

OTHER PUBLICATIONS

European Search Report issued on Aug. 30, 2010, in corresponding European Patent Application No. 10163521.7 (9 pages).

*Summons to attend oral proceedings pursuant to Rule 115(1) EPC* issued Jun. 27, 2012, in counterpart European Patent Application No. 10163521.7 (8pp).

"WebDAV," *Wikipedia: The Free Encyclopedia*. Wikimedia Foundation, Inc. Jun. 22, 2004. http://en.wikipedia.org/w/index.php?title=WebDAV&oldid=293929627 (5pp).

Japanese Office Action issued on Feb. 25, 2014 in counterpart Japanese Application 2010-130131 (7 pages, in Japanese, with partial English Translation).

Wayner, Peter. Measure Performance in the Here and Now in view of Advancement/Stability/Write; Clouding Computing [Thorough Comparisons among Four Services] Amazon EC2 | Google App Engine | GoGrid | AppNexus, Computerworld Japan, IDG Japan Inc., Dec. 1, 2008, vol. 5, No. 12, pp. 67-80 (18 pages, in Japanese, with partial English Translation).

* cited by examiner

CLIENT, BROKERAGE SERVER AND METHOD FOR PROVIDING CLOUD STORAGE

CROSS-REFERENCE TO RELATED APPLICATION

This application claims the benefit under 35 U.S.C. §119 (a) of a Korean Patent Application No. 10-2009-0055689 filed on Jun. 22, 2009, in the Korean Intellectual Property Office, the entire disclosure of which is incorporated herein by reference for all purposes.

BACKGROUND

1. Field

The following description relates to a cloud computing system, and more particularly, to a system for providing resources of a cloud infrastructure.

2. Description of the Related Art

Cloud computing is an Internet-based computing technology. In a computer network configuration, the Internet is represented by a "cloud" which is an abstraction of the underlying infrastructure. Cloud computing is a computing paradigm in which IT-related functions are supported in the form of services that are transmitted over a network. Cloud computing allows users to easily access desired services over the Internet, even if they do not possess particular knowledge regarding the technical infrastructures that are supported by the cloud computing. In other words, a user can utilize clouding computing to receive desired resources regardless of his or her physical location. In general, computing resources, which are managed by resource providers such as data centers, may include hardware resources, for example, CPU capability, memories or storages, development platforms, application programs, and the like. Services that are provided by resource providers to allow terminals to access computing capability may be referred to as cloud computing services.

Generally, for a client to access a remote storage, an access request indicating a particular remote storage is generated; to use the corresponding remote storage, a browsing application dedicated to the remote storage is installed. In other words, clients are only allowed access to particular storages statically mounted.

SUMMARY

In one general aspect, there is provided a client including an application execution unit and a client storage manager. The application execution unit executes at least one application. The client storage manager determines, when a file access request is received from the application, whether to process the file access request as a local file access request for access to a local storage of the client or as a cloud file access request for access to a cloud storage connected through the Internet.

The client may further include a cache to store a list of files stored in the cloud storage. The list of files stored in the cloud storage may be received from a brokerage server for supporting brokerage between the client and at least one cloud storage, and the list of files is updated according to information received from the brokerage server. The client storage manager may combine the list of files stored in the cloud storage with a list of files stored in the local storage, and provides the result of the combination to the application execution unit.

If the file access request is a file read request, the client storage manager may determine whether to process the file read request as a file read request for the local storage or as a file read request for the cloud storage, according to the list of files stored in the cloud storage.

The client may further include a brokerage unit to select at least one cloud storage suitable to process the cloud file access request from among a plurality of cloud storages connected through the network if the client storage manager determines to process the file access request as the cloud file access request for access to the cloud storage, and to support brokerage between the selected cloud storage and the client storage manager.

The client storage manager may determine whether to process the file access request as the local file access request or as the cloud file access request with respect to at least one selected from a group of a preset policy, a current status of the local storage, device environments, the kind and characteristics of contents, the proximity to a computing module, the size of the file, and any combinations thereof.

In another general aspect, there is provided a brokerage server for supporting a client connecting to a cloud storage, including a server storage manager to receive a cloud file access request for accessing the cloud storage from the client, and a storage broker to select at least one cloud storage suitable for processing the cloud file access request from among a plurality of is cloud storages connected through the network. The brokerage server may support brokerage between the selected at least one cloud storage and the client.

The brokerage server may include a metadata manager to manage metadata including information about files stored in the cloud storage, and an interface adaptor to convert the file access request received from the client into file operation of the cloud storage and to convert the result of execution on the file operation into a data format interpretable by the client. The server storage manager may transfer the result of processing the file access request to the client.

The metadata may be classified and managed according to individual clients or according to users of individual clients, and the metadata may be transferred to a cache of the client using the cloud storage. The metadata manager may store and manage information regarding a writing operation as metadata in response to the client writing a file in the cloud storage.

The storage broker may monitor the plurality of cloud storages and select the at least one cloud storage suitable for processing the cloud file access request according to cost and performance for the client, with respect to at least one of data attributes included in the file access request and the metadata.

The interface adaptor may convert the cloud file access request from the client into a file processing request for the cloud storage by one-by-one mapping of file operations and by modifying file operation parameters according to a result of the mapping. If an error occurs, the interface adaptor may convert the file access request into the file processing request by configuring a virtual file operation function for the file processing request according to a basic Application Programming Interface (API) installed in the cloud storage.

The brokerage server may be included in the client or in a cloud infrastructure.

In another general aspect, there is provided a method of providing a cloud storage, the is method including receiving a cloud file access request for access to a cloud storage from a client, selecting at least one cloud storage suitable for processing the cloud file access request from among a plurality of cloud storages, and supporting brokerage between the selected cloud storage and the client.

The method may include determining, when a file access request is received from an application of the client, whether to process the file access request as a local file access request for access to a local storage or as a cloud file access request for access to a cloud storage, and transferring, if the file access request is to be processed as the cloud file access request, the cloud file access request to a brokerage server for brokering a provision of the cloud storage between the client and the cloud storage.

The method may include determining, if the file access request is a file read request, whether to process the file read request as a file read request for the local storage or as a file read request for the cloud storage, according to a list of files stored in the cloud storage, wherein the list of files stored in the cloud storage is stored in a cache of the client.

The determining of whether to process the file access request as the local file access request or as the cloud file access request may include determining with respect to at least one selected from a group consisting of a preset policy, a current status of the local storage, device environments, the kind and characteristics of contents, the proximity to a corresponding computing module, the size of the file, and any combination thereof.

The selecting of the at least one cloud storage suitable for processing the cloud file access request may include selecting at least one cloud storage from among the plurality of cloud storages with respect to cost and performance for the client.

The method may include combining, at the client, a list of files stored in the cloud storage with a list of files stored in a local storage, and providing the combined file list to an is application that issued the file access request.

Other objects, features and advantages will be apparent from the following description, the drawings, and the claims.

Figure 1:
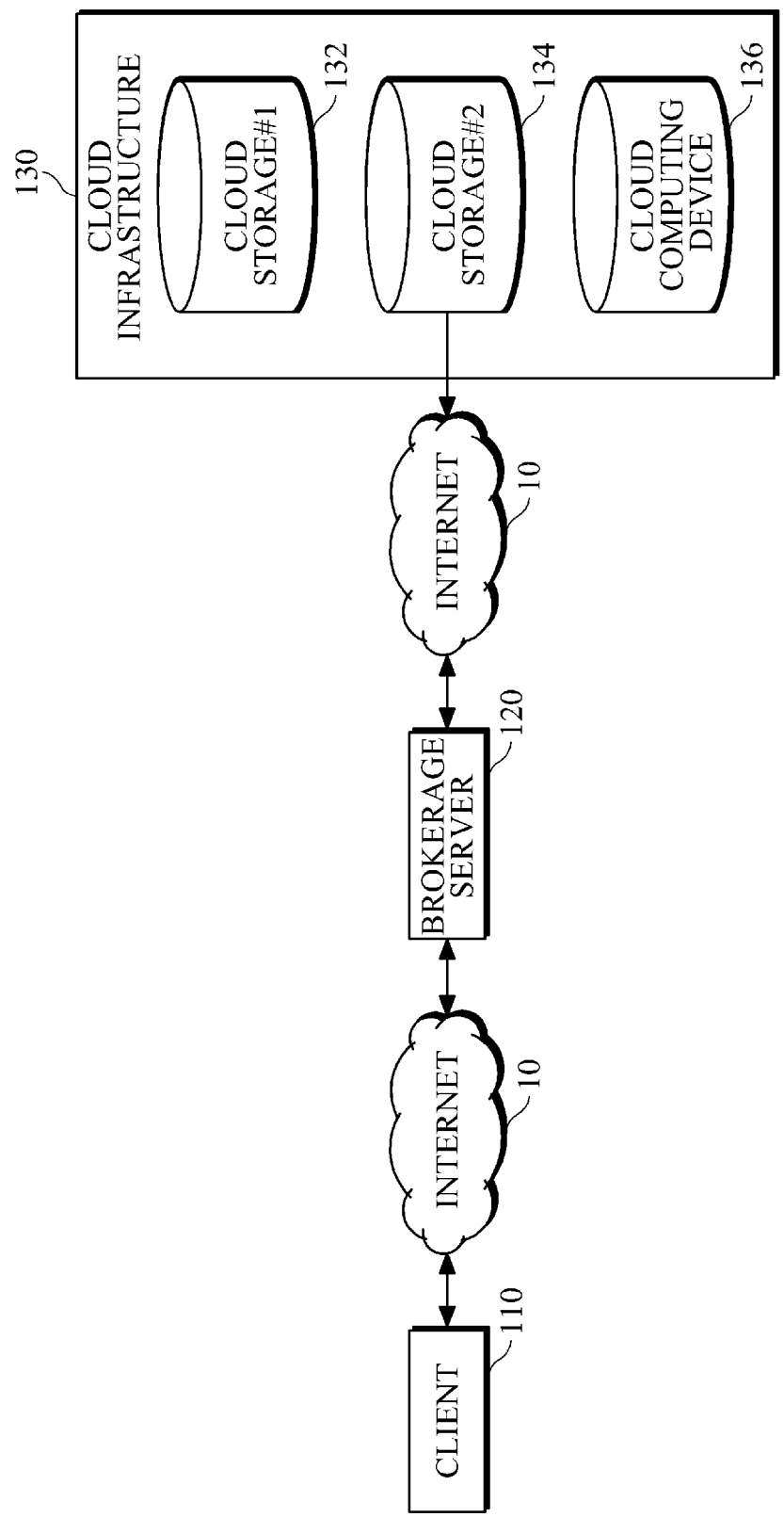
FIG. 1 is a diagram illustrating an example of a system configuration for providing cloud storages.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of a system configuration for providing cloud storages.

Referring to FIG. 1, a system for providing cloud storage may have a configuration in which a client 110, a brokerage server 120 and a cloud infrastructure 130 are connected to each other via the Internet 10. The client 110 may be an arbitrary electronic device, such as a mobile phone, a digital television, a set-top box, a digital music player, a portable media player, a notebook, and the like.

The client 110 may connect to the brokerage server 120 over the Internet 10 and receive cloud computing services from the brokerage server 120. The brokerage server 120, which may manage a variety of cloud computing services, selects an appropriate cloud computing service in response to a request from the client 110. Accordingly, the brokerage server 120 connects the cloud computing service to the client 110; the brokerage server 120 accesses an appropriate cloud infrastructure 130 through the Internet, thus providing a storage to the client 110. In other words, the brokerage server 120 connects to both the client 110 and the client infrastructure 130 over the Internet 10, thus supporting the use the cloud infrastructure 130 by the client 110.

When the client 110 issues a file access request, the brokerage server 120 selects, in response to the file access request, at least one appropriate cloud storage from among cloud storages in the cloud infrastructure 130. The brokerage server 120 also supports brokerage between the selected cloud storage and the client 110. The brokerage server 120 may be provided, as illustrated in FIG. 1, as a separate computing device that is connected to both the client 110 and the cloud infrastructure 130 via the Internet 10; however, some or all of the functional components of the brokerage server 120 may be integrated with one or both of the client 110 and the cloud infrastructure 130.

As an example illustrated in FIG. 1, the cloud infrastructure 130 may include cloud storages 132 and 134 and a cloud computing device 136. The type and number of cloud storages and cloud computing devices that may be included in a cloud infrastructure are not limited by this example; a cloud infrastructure may include a variety of any number of cloud storages and cloud computing devices.

The cloud storages 132 and 134 may each include a data storage and a web-based network interface for data transmission and reception through the Internet. Further, the cloud storages 132 and 134 may be heterogeneous storages. For example, the cloud storages 132 and 134 may be supplied from different providers and configured to store data in such a manner as to be accessible by different file systems.

Figure 2:
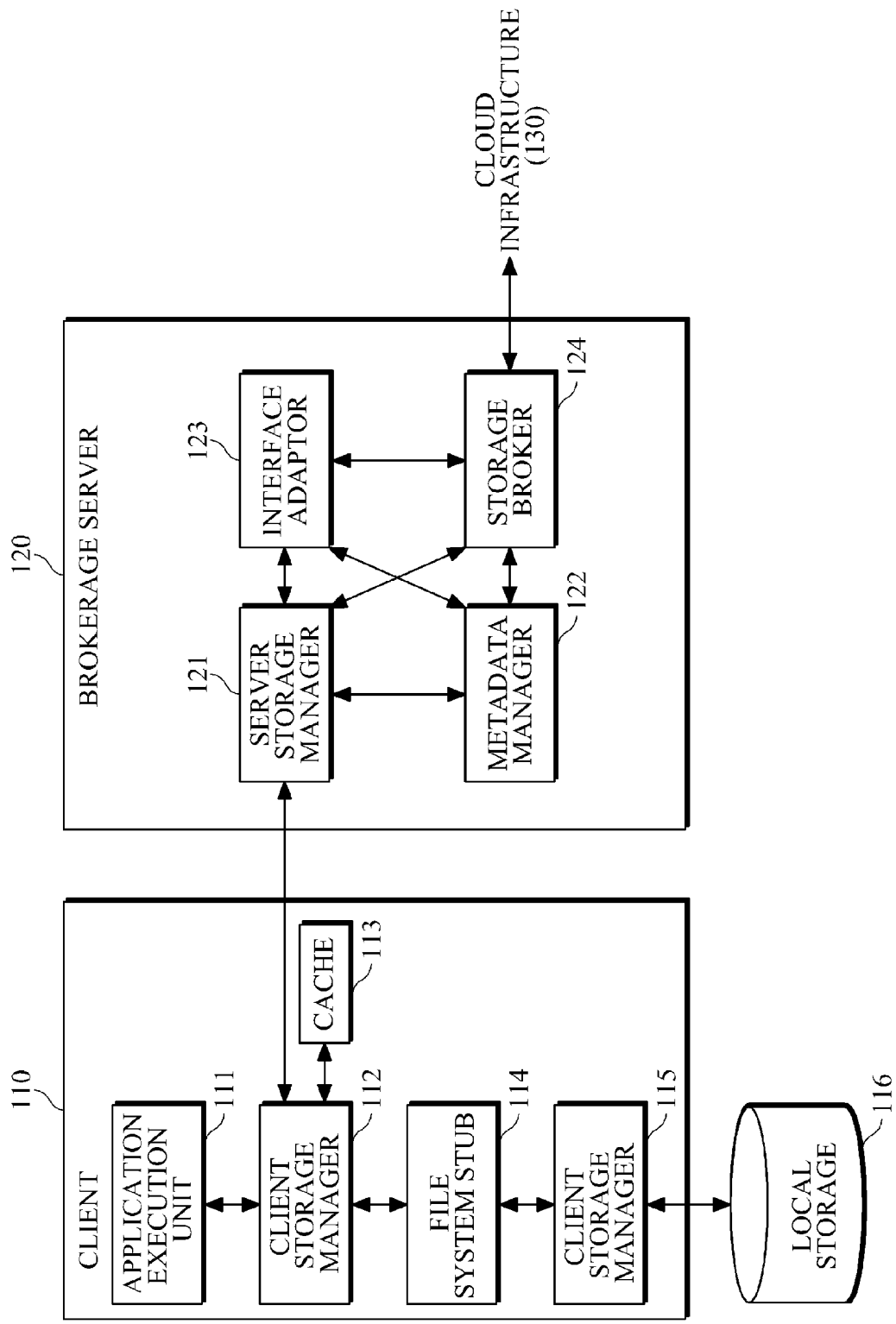
FIG. 2 is a diagram illustrating examples of configurations of a client and a brokerage server to provide cloud storages.

FIG. 2 illustrates examples of configurations of the client 110 and the brokerage server 120 to provide the cloud storages 132 and 134.

The client 110, through which a user receives cloud computing services, may be implemented as a mobile device for consumer electronics (CE) having low processing power. The client 110 may include an application execution unit 111, a client storage manager 112, a cache 113, a file system stub 114, a local file system 115, and a local storage 116.

The application execution unit 111 accesses particular files for execution of applications. In other words, applications that are executable by the application execution unit 111 may request access to particular files. For purposes of the description herein, the term "file access request" refers to execution of any operations associated with a corresponding file. That is, a file access request includes a file read request for reading a file stored in a storage, a file write request for writing a file in a storage, a file list request for receiving a file list about file information stored in a storage, and similar file access requests. In addition, a file access request may include various parameters and commands related to the corresponding file.

The client storage manager 112 may be referred to as an "elastic storage manager client," since it provides storage elasticity to the user of the client 110.

The cache 113 manages a list of files stored in the cloud storages 132 and 134, and is used to quickly determine, when receiving a file read request or a file list request, whether or not the corresponding file exists in the cloud storage 132 or 134. The list of files may be updated by receiving the result of the variation from the brokerage server 120 when any of file creation, file deletion, variations of file attributes, and the like occurs. Accordingly, the list of files may be quickly and accurately updated.

The file system stub 114 provides a standardized file system interface for an application executed by the application execution unit 111, regardless of the kind of a file system trying to access a storage. One example of a file system used by the file system stub 114 may be a Linux virtual file system.

The local file system 115 may be used to control the local storage 116. The local storage 116 may include one or both of a built-in storage and an external storage directly attached to the client 110.

Generally, when an application of a particular system issues a file access request, the application provides information for access to a particular storage in the file access request and directly accesses a file system stub 114. However, in the present example, when an application of the client 110 issues a file access request, the file access request is transferred to the client is storage manager 112. That is, the client storage manager 112 may intercept and process the file access request before it is transferred to the file system stub 114.

When receiving the file access request from the application, the client storage manager 112 may determine whether to process the file access request as a local file access request with access to the local storage 116, or as a cloud file access request with access to the cloud storage 132 or 134 included in the cloud infrastructure 130. The client storage manager 112 may also determine whether to process the file access request as a local file access request or as a cloud file access request. The determination may be made with respect to at least one of a preset policy, the current status of the local storage 116, device environments, the kind and characteristics of contents, the proximity to the corresponding computing module, the size of the corresponding file, and the like.

For example, if the file access request is a file write request, the client storage manager 112 provides access to the local storage 116 if the local storage 116 has sufficient space. If the available space of the local storage 116 is insufficient, the client storage manager 112 directs the file write request to the cloud storage 132 or 134 for processing. As another example, if the corresponding file that is to be written according to the file write request is classified as "large data", such as video data or multimedia data, the client storage manager 112 may direct the file write request to the cloud storage 132 or 134 for processing. Also, in consideration of proximity to the corresponding computing module, the client storage manager 112 may process the file access request as a request for access to the local storage 116 if the corresponding application is to be executed on the client 110. If the corresponding application is to be executed on a cloud computing device 136 (see FIG. 1) included in a cloud infrastructure 130, the client storage manager 112 may process the file access request as a request for access to a is cloud storage close to the cloud computing device 136, such as the cloud storage 134 (see FIG. 1).

Meanwhile, if the application issues a file read request, the client storage manager 112 senses a file read operation and intercepts the file read request. Accordingly, the client storage manager 112 determines whether the corresponding file is stored in the local storage 116 or in a remote cloud storage based on a file list stored in the cache 113.

If it is determined that the corresponding file is stored in the local storage 116, the client storage manager 112 accesses the local file system 115 via the file system stub 114. The local file system 115 accesses the local storage 116 to process the requested file. That is, a local file access request is transferred to the file system stub 114, the local file system 115, and the local storage 116, and the local file access requested processed in the client 110. The result of processing the local file access request is transferred to the corresponding application of the application execution unit 111 via the local file system 115, the file system stub 114, and the client storage manager 112.

If it is determined that the corresponding file is stored in the cloud storage 132 or 134, the client storage manager 112 requests that the brokerage server 120 process the file access request, providing access to the cloud storage 132 or 134. The cloud storage manager 112 may packetize file access requests for transmission to the brokerage server 120 through the Internet 10 and may de-packetize packets received through the Internet 10.

If the file access request is a file list request, the client storage manager 112 may acquire a list of files associated with the client 110, which are stored in the cloud storages 132 and 134, from the cache 113, and acquire a list of files stored in the local storage 116, from the local file system 115. The client storage manager 112 may combine the list of files stored in the cloud storages 132 and 134 with the list of files stored in the local storage 116 and provide the is combined file list to the application.

Meanwhile, in the example illustrated in FIG. 2, the client storage manager 112 may be located before the file system stub 114. However, the client storage manager 112 may be positioned between the file system stub 114 and the local file system 115. The client storage manager 112 may be appropriately disposed according to the operating system (OS) configuration of the client 110. The client storage manager 112 is configured to support an interface for both data transmission to and data reception from other components in the client 110, according to its actual position.

The configuration and operation of the brokerage server 120 is described below.

The brokerage server 120 may include a server storage manager 121, a metadata manager 122, an interface adapter 123, and a storage broker 124. Each of the server storage manager 121, metadata manager 122, interface adapter 123, and storage broker 124 may be configured to allow data transmission and reception.

When a cloud file access request is received, the server storage manager 121 determines which cloud storage of the cloud storages 132 and 134 is suitable for processing the cloud file access request. The following description is provided with respect to the cloud storage 134 determined to be suitable for processing the cloud file access request.

The metadata manager 122 manages metadata information regarding files stored in the cloud storages 132 and 134. The metadata information may include information regarding file owners (for example, service subscription information), client device information, security key information, file IDs, file names, file attributes (for example, the sizes or types of files), information indicating which cloud storages files are stored in, information regarding cloud storages (for example, information about a current status or quality of service information), is authority setting information for sharing with user groups or others, usage information, and the like.

The metadata manager 122 may manage file lists for each client or for each client's user. The metadata manager 122 may provide file lists to the client storage manager 112 via the server storage manager 121 at regular time intervals or in response to a request from the client storage manager 112. Accordingly, the cache 113 maintains updated file lists. Also, when receiving an access request for access to a particular file from a client who is not designated as an owner of the particular file, the server storage manager 121 may be configured to provide the requested file to the client if it is determined that the client has authority to access the file based on authority setting information of file information managed by the metadata manager 122.

According to the present example, to provide dynamic access to particular storages, the storage broker 124 may select an appropriate cloud storage which is suitable for processing a cloud file access request from the client 110 and is efficient in both cost and performance for the client 110. Also, the storage broker 124 may continue to monitor the statuses of the cloud storages. According to the results of the monitoring, the storage broker 124 may select a cloud storage based on storage usage costs and performance with respect to the client 100, in consideration of the system status, data attributes requested by the file access request, metadata of the corresponding file, setting information of the system, and similar parameters.

If an appropriate cloud storage (for example, 134) is determined, the interface adaptor 123 adapts the file operation of the file access request transmitted from the client storage manager 112 of the client 110 to a file operation suitable for an interface of the cloud storage 134, so that the client 110 can access the cloud storage 134. The interface adaptor 123 may perform interface adaptation by one-by-one mapping of the file operation of the file access request sent by the client 110 to file operation of a file processing request that is to be sent to the cloud is storage 134 and by modifying file operation parameters according to the results of the mapping. If the one-by-one mapping and the modifying of file operation parameters fail to perform interface adaptation, the interface adaptor 123 may configure a virtual file operation function for a file processing request using a basic Application Programming Interface (API) installed in the cloud storage 134 to process the file access request. Also, the interface adaptor 123 converts the result of processing according to the file access request into a command or data format that can be interpreted by the client 110, and transfers the result of the conversion to the client storage manager 112 via the server storage manager 121.

The result of the processing according to the file access request transferred to the client 110 is provided to the user through the corresponding application. Also, the result of the processing is overlaid on and mapped to predetermined locations of the client terminal. The result of the processing may be maintained for browsing without distinguishing whether the result of the processing is for the local storage 116 or for the cloud storage 132 or 134.

Accordingly, the brokerage server 120 connects to the client 110 over the Internet to process file access requests from the client 110, as described above; however, all or some of the functional components of the brokerage server 120 may be integrated with the client 110 or may be included in the cloud storages 132 and 134 or cloud computing device 136 of the cloud infrastructure 130.

Figure 3:
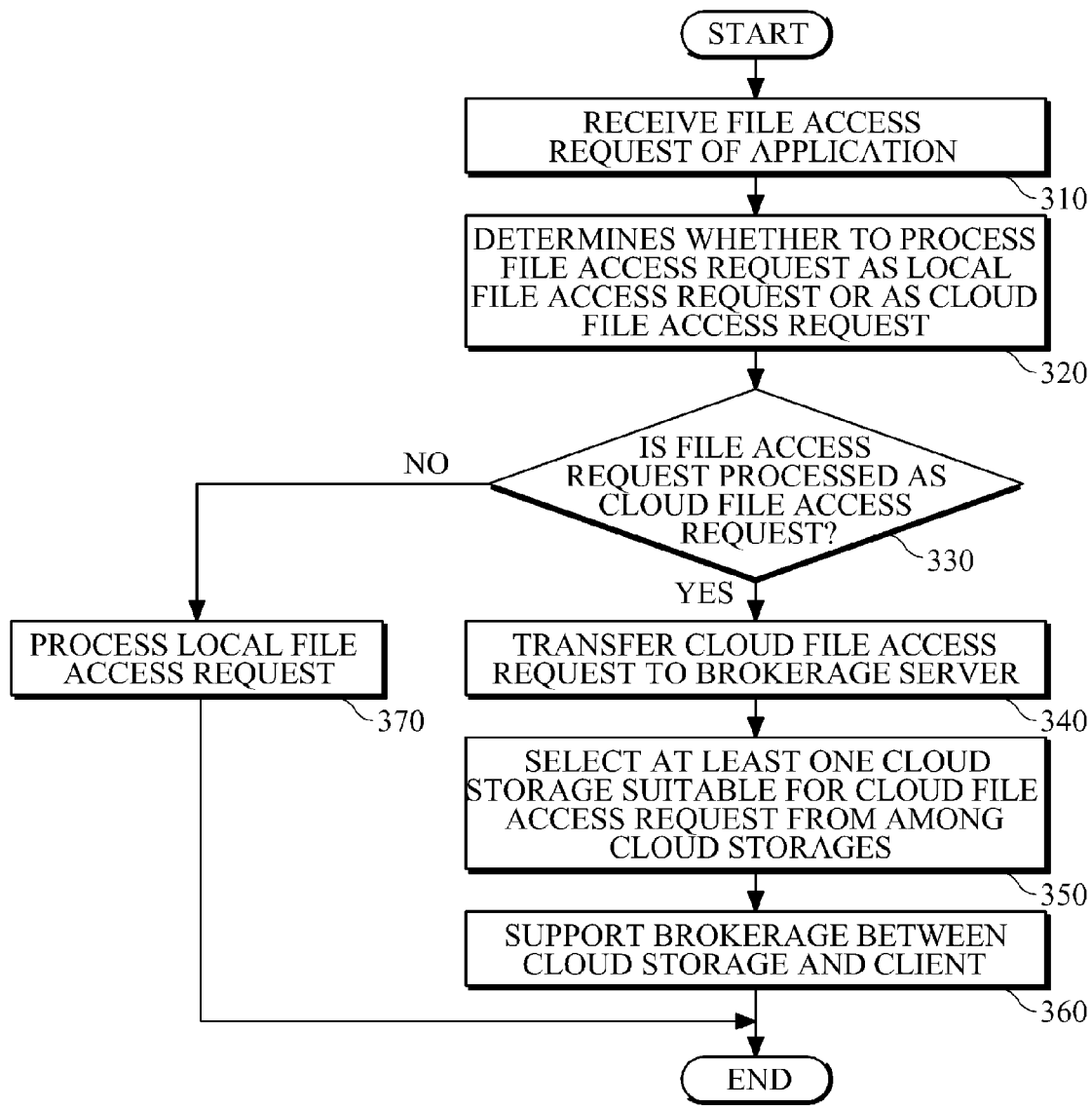
FIG. 3 is a flowchart illustrating an example of a method of providing cloud storages.

FIG. 3 illustrates an example of a method of providing cloud storages.

Referring to FIGS. 1, 2 and 3, if a file access request is received from an application of the client 110 (operation 310), the client 110 determines whether to process the file access request as a local file access request or as a cloud file access request (operation 320).

If the file access request is to be processed as a cloud file access request (operation 330), the client 110 transfers the cloud file access request to the brokerage server 120 which brokers is provision of a cloud storage between the client 110 and the cloud storages 132 and 134 (operation 340).

The brokerage server 120 selects at least one cloud storage (for example, cloud storage 134 of FIG. 1) suitable for processing the cloud file access request from among a plurality of cloud storages included in the cloud infrastructure 130 (operation 350). Thereafter, the brokerage server 120 serves as a brokerage between the cloud storage 134 and the client 110 (operation 360).

If it is determined in operation 330 that the file access request is to be processed as a local file access request (that is, not as a cloud file access request), the client 110 processes the local file access request (operation 370).

Figure 4:
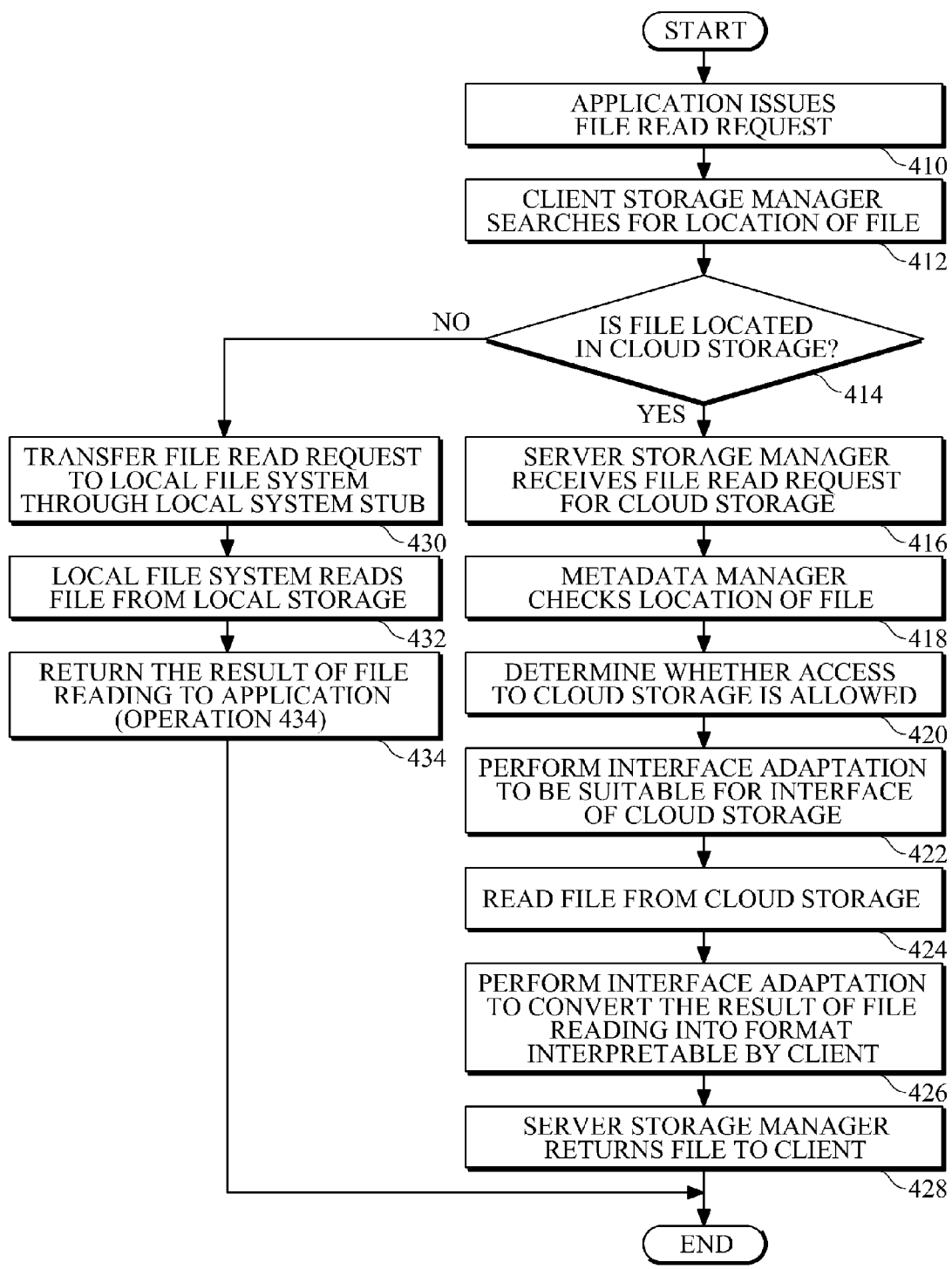
FIG. 4 is a flowchart illustrating an example of a system operation when a file access request from a client is a file read request.

FIG. 4 illustrates an example of a system operation if the file access request is a file read request.

Referring to FIGS. 2 and 4, if an application of the client 110 issues a file read request (operation 410), the client storage manager 112 searches for a location of the corresponding file (operation 412). The client storage manager 112 may determine whether the file is located in the local storage 116 or in a cloud storage (for example, cloud storage 132 or 134 of FIG. 1), according to a file list for cloud storages, which is stored in the cache 113. At this time, the client storage manager 112 may determine whether the file list is available. If the file list is not available, the client manager 112 receives the latest file list from the brokerage server 120 to update the file list. A process of updating a file list is described further below, with reference to FIG. 7.

If the corresponding file is located in the cloud storage (operation 414), the server storage manager 121 receives the file read request from the client storage manager 112 (operation 416). The file read request is transferred to the metadata manager 122, and the metadata manager 122 is checks the location of the file (which cloud storage stores the file, a storage location of the file in the cloud storage, and the like) from the metadata of the file read request (operation 418). The storage broker 124 determines whether access to the cloud storage storing the corresponding file is allowed (operation 420).

When access to the cloud storage storing the file is allowed, the interface adaptor 123 performs interface adaptation to read the file from the cloud storage (operation 422). The interface adaptation includes a process of converting the file read request into a format that can be interpreted by the cloud storage. The file is read from the cloud storage (operation 424), and the interface adaptor 123 receives the file from the cloud storage and then converts it into a format that can be interpreted by the client 110 (operation 426). The file in the converted format is transferred to the server storage manager 121, and the server storage manager 121 returns the file to the client storage manager 112. The client storage manager 112 transfers the file to the application which has issued the file read request (operation 428).

However, if it is determined in operation 414 that the file is located in the local storage 116, the client storage manager 112 transfers the file read request to the local file system 115 through the local system stub 114 (operation 430). The local file system 115 reads the requested file from the local storage 116 (operation 432), and the read file is returned to the application (operation 434).

Figure 5:
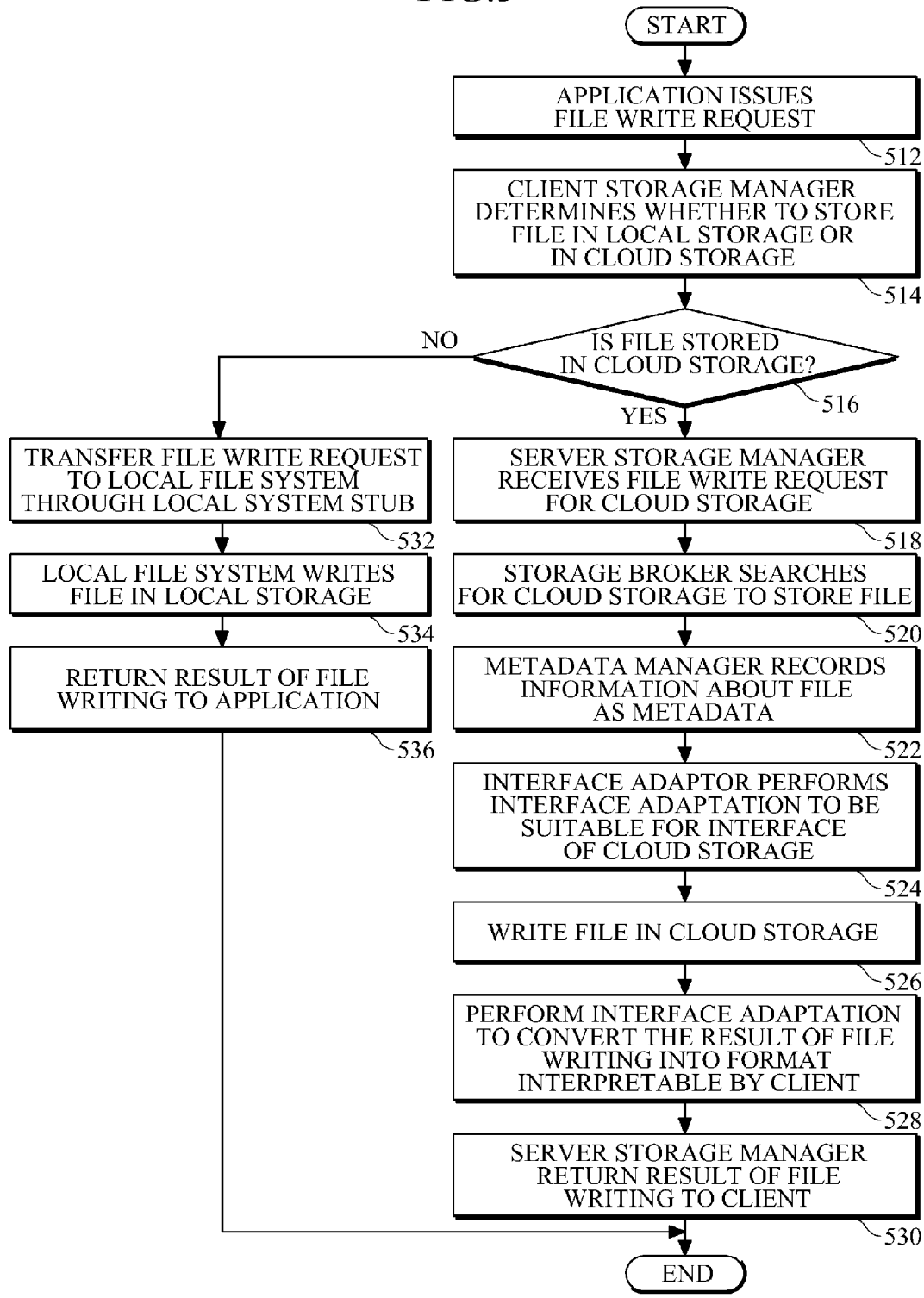
FIG. 5 is a flowchart illustrating an example of a system operation when a file access request from a client is a file write request.

FIG. 5 illustrates an example of a system operation when the file access request is a file write request.

When an application issues a file write request (operation 512), the client storage manager 112 may intercept the file write request and determine whether to store the corresponding file in the local storage 116 or in a remote cloud storage (operation 514). The cloud storage manager 112 may determine whether to store the corresponding file in the local is storage 116 or in a remote cloud storage based on its own policy or a user-defined policy.

In operation 516, it is determined whether the file is to be stored in a cloud storage. If the file is to be stored in a cloud storage, the file write request is transferred to the server storage manager 121 of the brokerage server 120 (operation 518). Then, the storage broker 124 searches for a cloud storage based on costs and performance of storing the file for a user of the client 110 according to a policy of the server storage manager 121 or a policy requested by the user (operation 520).

If an appropriate cloud storage is found, the metadata manager 122 records, as metadata, information about the file, for example, a location at which the file will be stored in the cloud storage, file attributes, and the like (operation 522).

Then, the interface adaptor 123 performs interface adaptation for file operation to write the file in the cloud storage (operation 524) and stores the file in the cloud storage (operation 526). Also, the interface adaptor 123 performs interface adaptation on the result of the writing (operation 528) to convert the result of the writing into a format that can be interpreted by the client 110. The result of the conversion is returned to the client storage manager 112 via the server storage manager 121 (operation 530).

However, if it is determined in operation 516 that the file is to be stored in the local storage 116 and not in a cloud storage, the client storage manager 112 transfers the file write request to the local file system 115 through the local system stub 114 (operation 532). The local file system 115 writes the file in the local storage 116 (operation 534) and returns the result of the file writing to the application (operation 536).

Figure 6:
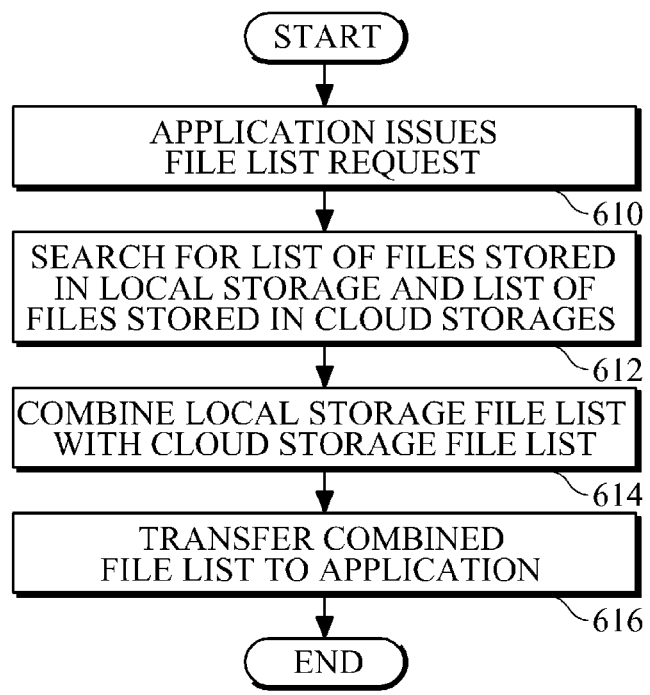
FIG. 6 is a flowchart illustrating an example of a system operation when a file access request from a client is a file list request.

FIG. 6 illustrates an example of a system operation when the file access request is a file list request.

Referring to FIGS. 2 and 6, an application issues a file list request to access a logical is architectural file list, for example, a directory, a partition, and the like (operation 610). The client storage manager 112 detects the file list request and searches for a list of files stored in the local storage 116 and a list of files stored in cloud storages (operation 612). That is, a local storage file list request is transferred to the local file system 115. The local file system 115 searches for the local storage 116, creates a list of files stored therein, and transfers the file list to the client storage manager 112. The client storage manager 112 may acquire a list (that is, a cloud storage file list) of files stored in cloud storages from the cache 113. The client storage manager 112 may determine whether the cloud storage file list is available, and if the cloud storage file list is not available, the client storage manager 112 receives a recently updated file list from the brokerage server 120.

The client storage manager 112 may combine the local storage file list with the cloud storage file list (operation 614), and transfer the combined file list to the application (operation 616). Accordingly, the user may receive, through an application in use, both a list of files stored in the local storage 160 and a list of files stored in cloud storages. Therefore, a user may easily access a desired file according to a user interface (UI) of an application executed by the client 110, without having to consider either the type of the application or whether the file is stored in the local storage 160 or in a cloud storage.

Figure 7:
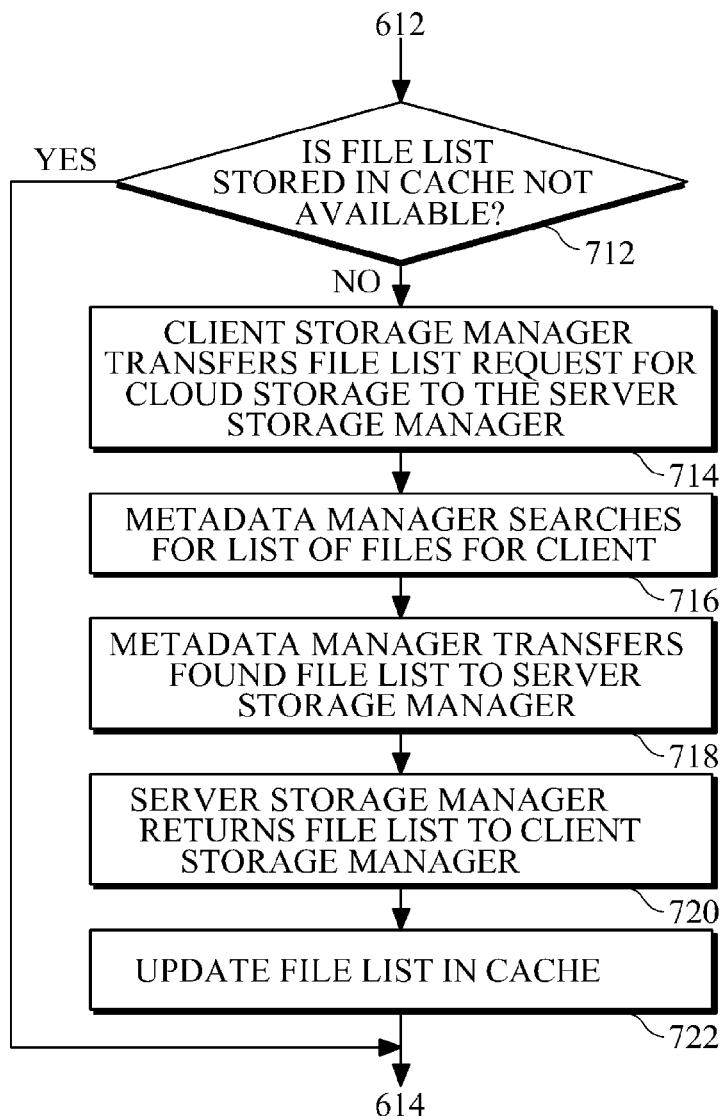
FIG. 7 is a flowchart illustrating an example of a process of updating a cloud storage file list when a cloud storage file list stored in a cache is non-available.

FIG. 7 illustrates an example of a process of updating a cloud storage file list when a cloud storage file list stored in the cache 113 is not available.

If it is determined that the cloud storage file list stored in the cache 113 is not available, for example, if the cloud storage file list has not been updated within a predetermined validity period (operation 712), the client storage manager 112 transfers a cloud storage file list request to the server storage manager 121 (operation 714).

Accordingly, the metadata manager 122, which manages information regarding files is stored in cloud storages for each client, receives the cloud storage file list request and searches for a cloud storage file list in use by the client 110, without having to directly access any cloud storage. The metadata manager 122 transfers the found file list to the server storage manager 121 (operation 718).

The server storage manager 121 returns the cloud file list to the client storage manager 112 (operation 720). The client storage manager 112 stores the cloud file list in the cache 113 to update the cloud file list (operation 722).

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and is executed in a decentralized manner.

According to one example, CE terminals that may form interconnections may overcome certain limitations of their local storages by utilizing a network infrastructure and cloud storage resources. Accordingly, users may easily access and utilize cloud storages with existing UIs.

Furthermore, cloud storages may be suitable for contents shared between devices or between users since they have higher accessibility than local storages of CE terminals. Furthermore, cloud storages may preserve contents more safely due to their high security.

Also, it may be possible to reduce costs or improve performance for each content by utilizing a storage brokerage function of a brokerage server, without implementing dedicated cloud storages.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A client comprising:
an application execution unit configured to execute at least one application; and
a client storage manager
configured to determine, when a file access request is received from the application, whether to process the file access request as a local file access request to access a local storage of the client or as a cloud file access request to access a cloud storage connected through the Internet,
configured to combine a list comprising files stored in the cloud storage with a list comprising files stored in the local storage, and provide the result of the combination to the application execution unit, and when the file access request is a file write request, the client storage manager is configured to provide access to the local storage when the local storage has sufficient spaces; and
a brokerage unit
configured to select at least one cloud storage to process the cloud file access request from among cloud storages connected through the network when the client storage manager determines to process the file access request as the cloud file access request for access to the cloud storage, and
configured to select the at least one cloud storage based on storage usage cost and performance with respect to the client.

2. The client of claim 1, further comprising:
a cache configured to store the list of files stored in the cloud storage.

3. The client of claim 2, wherein the list of files is updated according to information received from the brokerage server.

4. The client of claim 2, wherein, when the file access request is a file read request, the client storage manager determines whether to process the file read request as a file read request for the local storage or as a file read request for the cloud storage, according to the list of files stored in the cloud storage.

5. The client of claim 1, wherein the client storage manager determines whether to process the file access request as the local file access request or as the cloud file access request with respect to at least one of a preset policy, a current status of the local storage, device environments, the kind and characteristics of contents, the proximity to a computing module, the size of the file, and any combinations thereof.

6. A brokerage server for supporting a client connecting to a cloud storage, comprising:
a server storage manager configured to receive a cloud file access request to access the cloud storage from the client, wherein the client combines a list comprising files stored in the cloud storage with a list comprising files stored in a local storage, and when the file access request is a file write request, the client provides access to the local storage when the local storage has sufficient space;
a storage broker configured to select at least one cloud storage to process the cloud file access request from among a plurality of cloud storages connected through the network when the file access request is determined to be processed as the cloud file access request for access to the cloud storage, and configured to select the at least one cloud storage based on storage usage cost and performance with respect to the client; and
wherein the client is configured to determine, when a file access request is received from an application, whether to process the file access request as a local file access request to access a local storage of the client or as a cloud file access request to access cloud storage through the Internet.

7. The brokerage server of claim 6, further comprising:
a metadata manager configured to manage metadata including information about files stored in the cloud storage; and
an interface adaptor configured to convert the file access request received from the client into file operation of the cloud storage and to convert the result of execution on the file operation into a data format interpretable by the client,
wherein the server storage manager transfers the result of processing the file access request to the client.

8. The brokerage server of claim 7, wherein the metadata is classified and managed according to individual clients or according to users of individual clients, and the metadata is transferred to a cache of the client using the cloud storage.

9. The brokerage server of claim 7, wherein the metadata manager stores and manages information regarding a writing operation as metadata in response to the client writing a file in the cloud storage.

10. The brokerage server of claim 7, wherein the storage broker monitors the plurality of cloud storages and selects the at least one cloud storage to process the cloud file access request according to the cost and the performance with respect to the client, with regard to at least one of data attributes included in the file access request and the metadata.

11. The brokerage server of claim 7, wherein the interface adaptor converts the cloud file access request from the client into a file processing request for the cloud storage by one-by-one mapping of file operations and by modifying file operation parameters according to a result of the mapping, and
when an error occurs, the interface adaptor converts the file access request into the file processing request by configuring a virtual file operation function for the file processing request according to a basic Application Programming Interface (API) installed in the cloud storage.

12. The brokerage server of claim 6, wherein the brokerage server is included in the client or in a cloud infrastructure.

13. A method of providing a cloud storage, comprising:
determining, when a file access request is received from an application, whether to process the file access request as a local file access request to access local storage of the client or as a cloud file access request to access cloud storage through the Internet;
receiving from a client a cloud file access request to access a cloud storage, wherein the client combines a list comprising files stored in the cloud storage with a list comprising files stored in a local storage, and when the file access request is a file write request, the client provides access to the local storage when the local storage has sufficient space;

selecting at least one cloud storage to process the cloud file access request from among a plurality of cloud storages when the file access request is determined to be processed as the cloud file access request for access to the cloud storage; and selecting the at least one cloud storage based on storage usage cost and performance with respect to the client.

14. The method of claim 13, further comprising:

determining, when a file access request is received from an application of the client, whether to process the file access request as a local file access request to access a local storage or as a cloud file access request to access a cloud storage; and transferring, when the file access request is to be processed as the cloud file access request, the cloud file access request to a brokerage server for brokering a provision of the cloud storage between the client and the cloud storage.

15. The method of claim 14, further comprising:

determining, when the file access request is a file read request, whether to process the file read request as a file read request for the local storage or as a file read request for the cloud storage, according to a list of files stored in the cloud storage, wherein the list of files stored in the cloud storage is stored in a cache of the client.

16. The method of claim 14, wherein the determining of whether to process the file access request as the local file access request or as the cloud file access request further comprises:

determining with respect to at least one of a preset policy, a current status of the local storage, device environments, the kind and characteristics of contents, the proximity to a corresponding computing module, the size of the file, and any combination thereof.

17. The method of claim 13, further comprising:

combining, at the client, a list of files stored in the cloud storage with a list of files stored in a local storage; and providing the combined file list to an application that issued the file access request.

* * * * *